United States Patent
Barber et al.

(10) Patent No.: US 10,747,512 B2
(45) Date of Patent: Aug. 18, 2020

(54) PARTIAL OBJECT INSTANTIATION FOR OBJECT ORIENTED APPLICATIONS

(71) Applicant: International Business Machines Corporation, Armonk, CA (US)

(72) Inventors: Ronald J. Barber, San Jose, CA (US); Rene Mueller, San Jose, CA (US); Vijayshankar Raman, Sunnyvale, CA (US); Richard S. Sidle, Mountain View, CA (US); Pinar Tozun, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 15/400,694

(22) Filed: Jan. 6, 2017

(65) Prior Publication Data

US 2018/0196650 A1     Jul. 12, 2018

(51) Int. Cl.
*G06F 9/44* (2018.01)
*G06F 8/41* (2018.01)
*G06F 11/36* (2006.01)

(52) U.S. Cl.
CPC .............. *G06F 8/443* (2013.01); *G06F 11/36* (2013.01)

(58) Field of Classification Search
CPC .................. G06F 11/36; G06F 8/443
See application file for complete search history.

(56) References Cited

U.S. PATENT DOCUMENTS

| | | | | |
|---|---|---|---|---|
| 6,145,121 A * | 11/2000 | Levy | .................... | G06F 11/3461 703/22 |
| 6,199,078 B1 * | 3/2001 | Brittan | .................. | G06F 17/246 715/234 |
| 6,446,254 B1 * | 9/2002 | Chapman | ............ | G06F 9/44573 717/116 |
| 7,158,994 B1 * | 1/2007 | Smith | ............... | G06F 16/24539 707/717 |
| 7,469,249 B2 | 12/2008 | Mihaila et al. | | |
| 7,627,856 B2 | 12/2009 | Schwarzmann | | |
| 7,669,193 B1 * | 2/2010 | Chipman | ............... | G06F 9/4488 717/152 |
| 8,005,848 B2 | 8/2011 | Champion et al. | | |
| 8,141,063 B2 | 3/2012 | Foley | | |
| 2002/0147857 A1 * | 10/2002 | Sanchez, II | ........... | G06F 9/4493 719/316 |
| 2004/0158819 A1 * | 8/2004 | Cuomo | ............... | G06F 11/3624 717/128 |
| 2006/0047696 A1 | 3/2006 | Larson et al. | | |
| 2007/0005613 A1 * | 1/2007 | Singh | ..................... | G06Q 20/40 |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

*Primary Examiner* — Adam Lee
(74) *Attorney, Agent, or Firm* — Sherman IP LLP; Kenneth L. Sherman; Steven Laut

(57) ABSTRACT

One embodiment provides a method for transparent partial object instantiation for object oriented applications including analyzing, by a processor, application code to determine a list of objects. The processor determines a list of accessed fields for each of the objects based on performing analysis for each function in the application code for accessed fields and other functions invoked.

16 Claims, 8 Drawing Sheets

800

(56) References Cited

U.S. PATENT DOCUMENTS

| | | | |
|---|---|---|---|
| 2014/0282586 A1* | 9/2014 | Shear | G06F 9/5072 718/104 |
| 2015/0149745 A1* | 5/2015 | Eble | G06F 9/526 712/216 |
| 2015/0169226 A1* | 6/2015 | Shen | G06F 12/0238 711/103 |
| 2016/0070579 A1* | 3/2016 | Furtwangler | G06F 8/315 717/116 |
| 2018/0107463 A1* | 4/2018 | Heilbrunn | G06F 21/563 |

* cited by examiner

600

ClassAnalyze Process

Input: A class C with methods to analyze
Input: Composition Hierarchy CH (list of classes)
Output: For each method of C, a list of fields accessed in the CH, by that method (through any sequence of invocations)
Var: InvocationQueue, a first in first out queue of methods directly called by a class that need to be resolved for accessed fields)
Var: AccessedFlds, a memorization of fields of CH accessed by each method of C directly or indirectly. (providing a map from method to accessed fields)
Var: AnalyzedMethods, a set memorization of the methods analyzed while traversing a method of C. (providing a set for existence checking)

```
// Run ASM on each method C.M of C (using ASM's MethodVisitor)
```
foreach *method C.M of C* do
    clear AnalyzedMethods set
    push C.M → InvocationQueue
    while InvocationQueue not empty do
        pop D.N ← InvocationQueue
```
        // Check if method has yet to be examined (avoid infinite loop)
```
        if D.N ∉ AnalyzedMethods then
```
            // Run ASM on each method D.N of D (using ASM's MethodVisitor)
```
            fldsAccessedViaN ← fields of CH directly accessed by D.N
            AccessedFlds(C.M) ← AccessedFlds(C.M) ∪ fldsAccessedViaN
            push methods (of *any* class) directly invoked by D.N → InvocationQueue
            AnalyzedMethods ← AnalyzedMethods ∪ D.N
        end
    end
end
return AccessedFlds

```
Input: Operator pipeline for a query
Input: Class hierarchy
Output: Operator pipeline, augmented with SetField
        and SetArrayFld operators
allNeededCols ← ∅;
foreach operator O in pipeline do
    // Invoke ClassAnalyze on functor class
       providing the functions in O
    colsNeededByO ← CLASSANALYZE(functor(O));
    // Tag O with the set of fields needed by
       operators up to O
    allNeededCols ← allNeededCols ∪ colsNeededByO;
    neededCols(O) ← allNeededCols
end
foreach operator O in pipeline do
    Find minimal sub-tree of class hierarchy, rooted at
    the main class, having all fields in neededCols(O);
    neededCols(O) ← neededCols(O)∪ offset columns
    for array fields determining this sub-tree;
    if neededCols(O) has new columns (not loaded yet)
    then
        - add (before O) SetArrayFld for any array
          columns[4];
        - add (before O) SetField for any non-array
          columns
    end
end
```

FIG. 7

PARTIAL OBJECT INSTANTIATION FOR OBJECT ORIENTED APPLICATIONS

BACKGROUND

The popularity of Object Oriented languages and environments and the volume of applications developed exploiting these benefits challenge any opportunity to exploit a selective instantiation of persisted fields required for the specific application. For example, a Customer object may have thirty fields that contain base information such as Name and Customer ID, but also contain Address, multiple phone numbers, birth date, etc. A particular application that needs to perform a mailing to a set of customers may only need Name and Address fields, yet when the application accesses a Customer object the entire set of fields needed to populate the object must be retrieved and the object materialized.

SUMMARY

Embodiments relate to transparent partial object instantiation for object oriented applications. One embodiment provides a method for transparent partial object instantiation for object oriented applications including analyzing, by a processor, application code to determine a list of objects. The processor determines a list of accessed fields for each of the objects based on performing analysis for each function in the application code for accessed fields and other functions invoked.

These and other features, aspects and advantages of the present invention will become understood with reference to the following description, appended claims and accompanying figures.

BRIEF DESCRIPTION OF THE DRAWINGS

FIG. 6 illustrates an example pseudocode flow diagram for analyzing general functions to find used members, according to an embodiment;

FIG. 7 is an example pseudocode flow diagram for selective column loading for general query, according to an embodiment.

DETAILED DESCRIPTION

Figure 1:
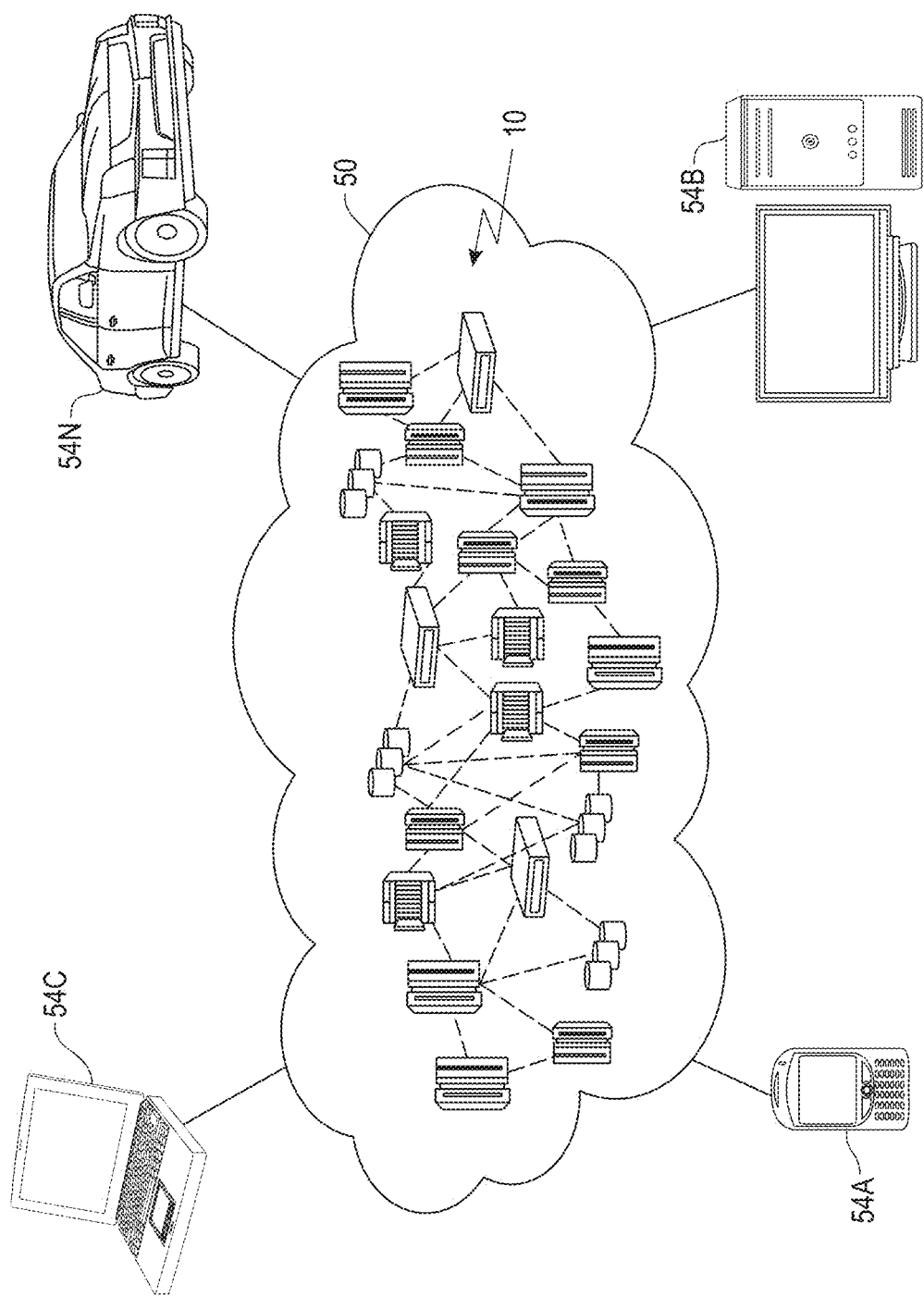
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for transparent partial object instantiation for object oriented applications. One or more embodiments provide for selective instantiation of objects thus reducing input/output (I/O) to access the persisted fields that are not referenced, and the processing "costs" to materialize them. One embodiment may reduce the cache overhead by a technique to re-writing the objects to contain only the fields referenced by the application. This directly applies to read-only access to data and in an update environment the infrastructure would need to retrieve any additional fields needed to perform the update action. This selective instantiation has most impact on I/O when used in conjunction with a column store; however, in a row store there can be the advantage taken in terms of avoiding possible decompression or leveraging index or cache structures that contain a subset of fields.

One embodiment provides a method for transparent partial object instantiation for object oriented applications including analyzing, by a processor, application code to determine a list of objects. The processor determines a list of accessed fields for each of the objects based on performing analysis for each function in the application code for accessed fields and other functions invoked.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
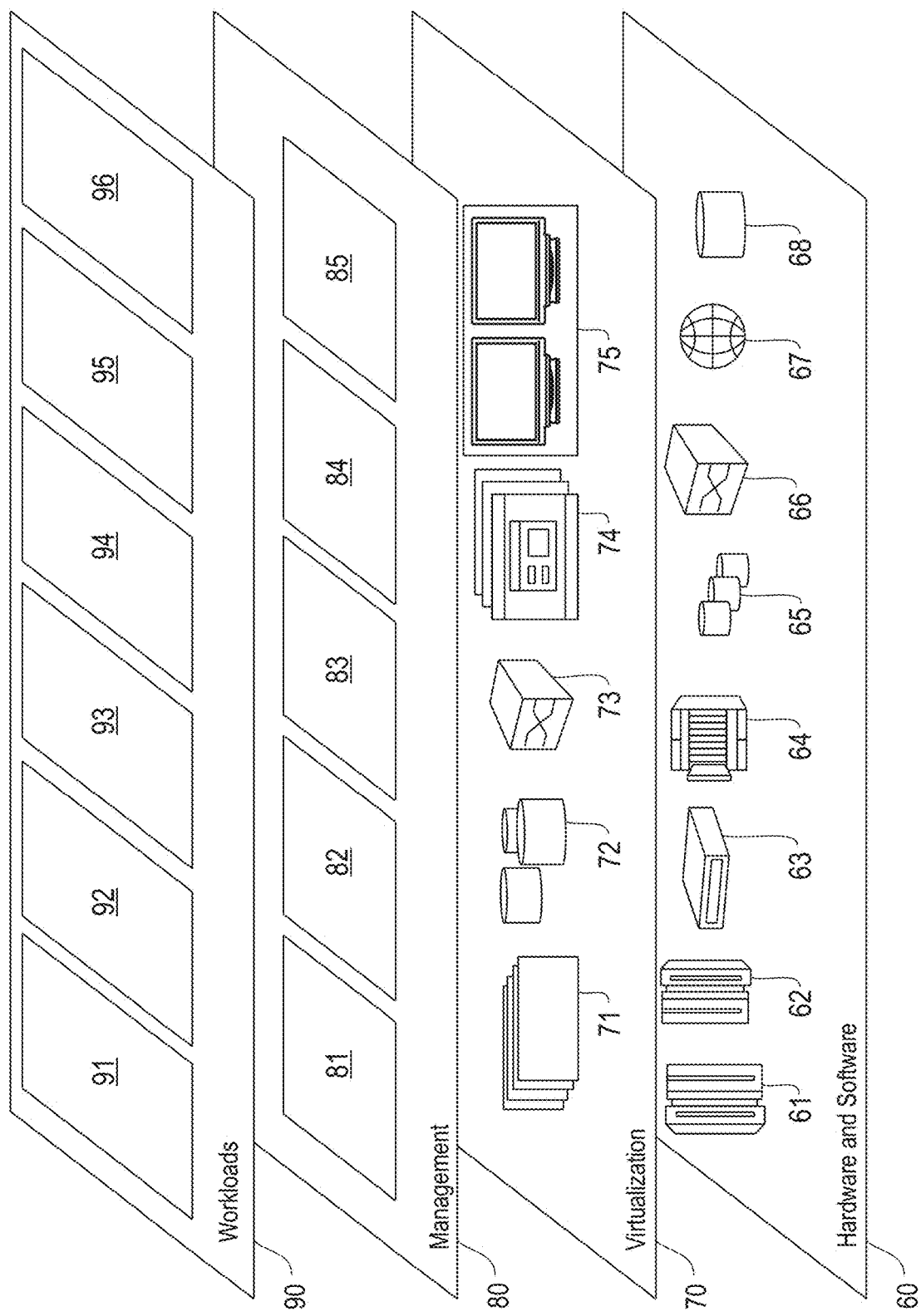
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transparent partial object instantiation for object oriented applications processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
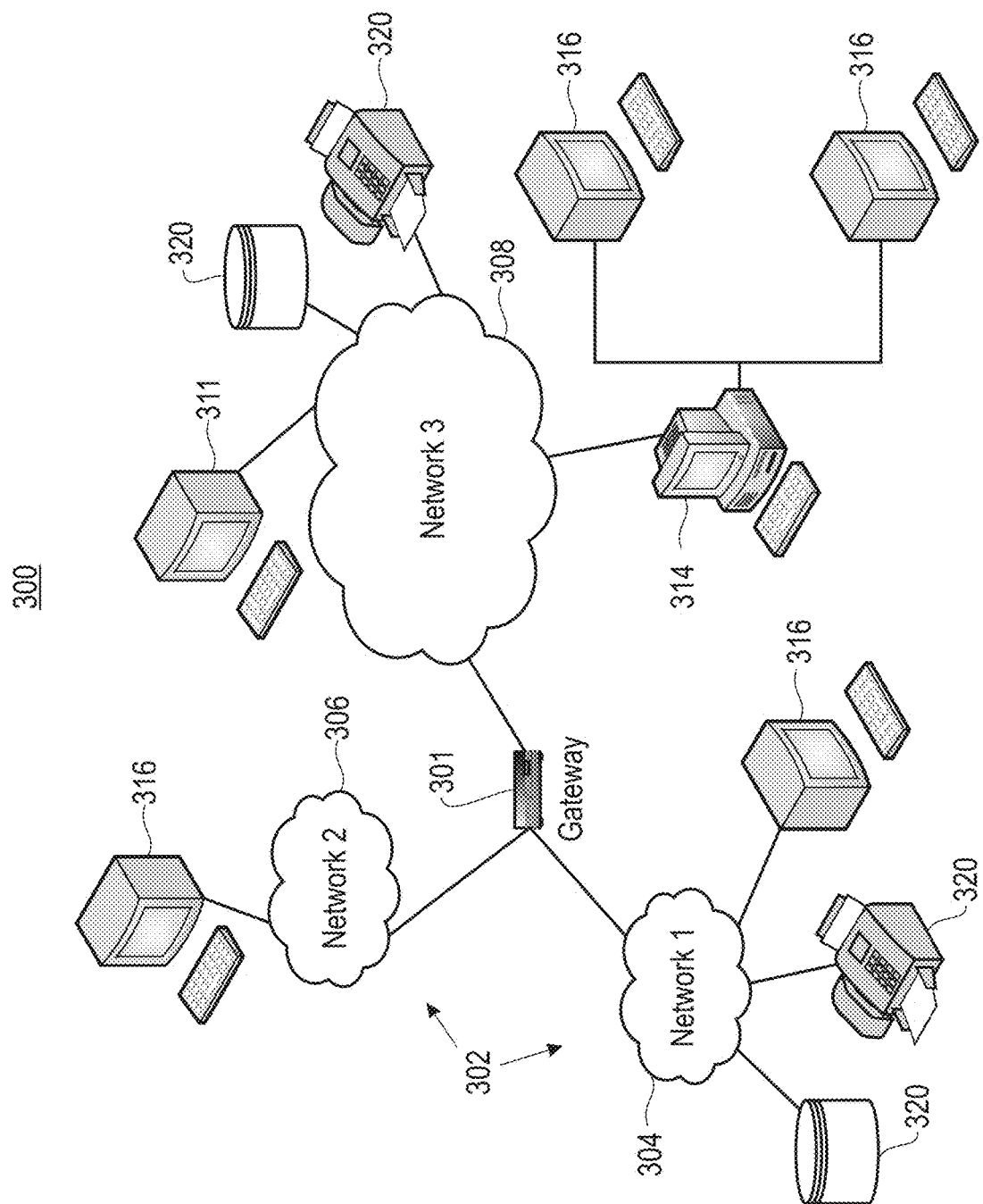
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
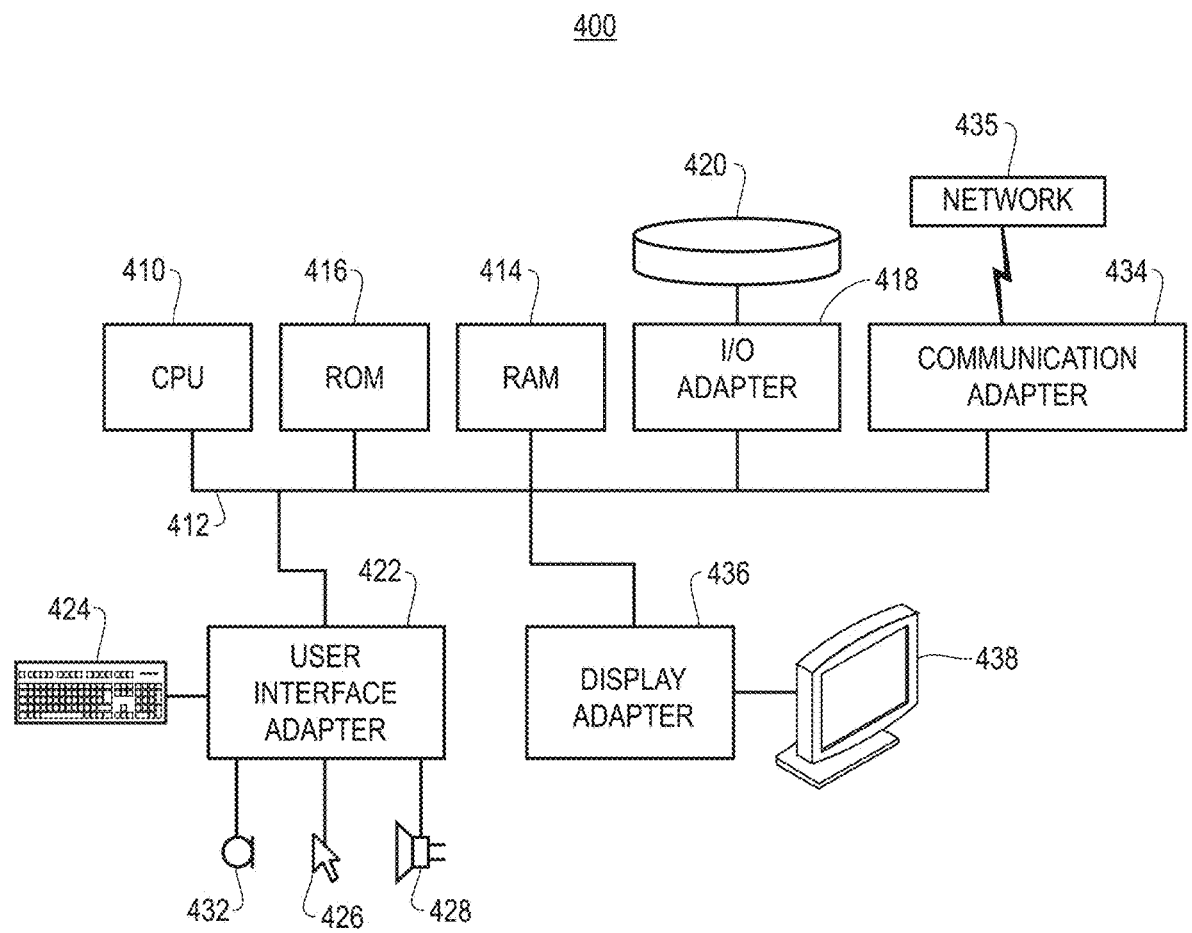
FIG. 4 shows a representative hardware environment that may be associated with the servers and/or clients of FIG. 1, according to an embodiment.

FIG. 4 shows a representative hardware system 400 environment associated with a user device 416 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
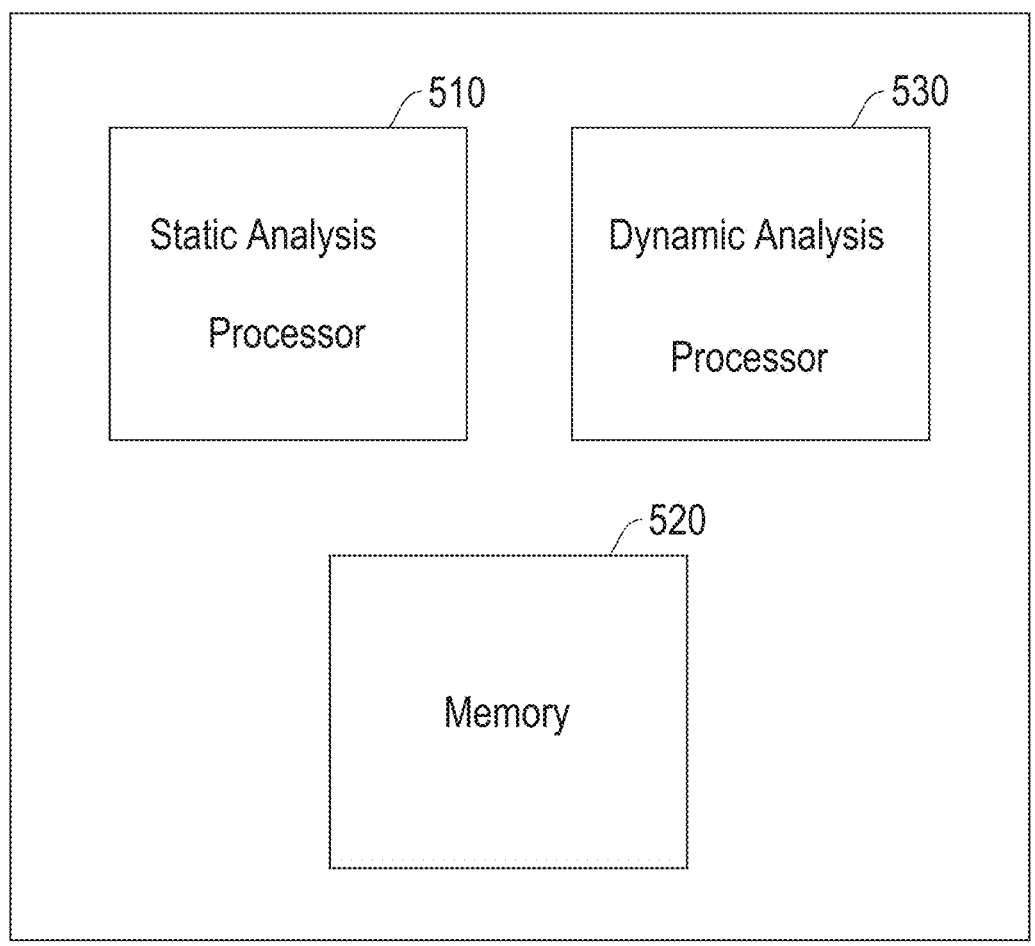
FIG. 5 is a block diagram illustrating processors for transparent partial object instantiation for object oriented applications, according to an embodiment.

FIG. 5 is a block diagram illustrating processors for transparent partial object instantiation for object oriented applications, according to an embodiment. Node 500 includes a static analysis processor 510, memory 520 and a dynamic analysis processor 530. The memory 520 may be implemented to store instructions and data, where the instructions are executed by the static analysis processor 510 and the dynamic analysis processor 530. In one example, the static analysis processor 510 provides static analysis of an executing application code to yield a list of persisted objects and provides further analysis to obtain a list of accessed fields for each of these objects. In one embodiment, the static analysis processor 510 may perform in a nested object environment, for example a Purchase_Order class may have an array of Line_Item class objects contained within it. In one example, the static analysis processor 510 performs by recursively stepping through the application code. For each function, the static analysis processor 510 analyzes what fields it accesses and other functions it invokes. Then the static analysis processor 510 recursively analyzes the invoked functions to find a total list of accessed fields.

In one embodiment, the dynamic analysis processor 530 provides catching faults when un-materialized fields of persisted objects are referenced by dynamically processing the code that fetches any needed persistent data and then filling in the class field to allow the access. This has the advantage over static analysis in that fields are only selectively materialized which is valuable in cases where their access is conditional. In one embodiment, during dynamic analysis processing by the dynamic analysis processor 530, any superclasses are treated as members as far as their instantiation. Setter methods and constructors are treated specially in that they primarily set up fields and may set up fields that are determined as never accessed. In one example, if the dynamic analysis processor 530 determines no access, the code that provides assignments may be eliminated or avoided.

In one embodiment, the dynamic analysis processor 520 distinguishes between the case where the user supplied the setter (i.e., the dynamic analysis processor 520 has to perform an extra analysis of how many of the field set in the setter method are actually referenced later), and the case where the system is performing the setting (e.g., as in Apache Spark)—in the latter case the processing is simpler. In one example for the latter case, column-setter methods are required. The column-setter methods may be obtained via reflection (JAVA®), via offsetof+memcpy(c++), or via user-supplied methods (JAVA® beans).

In one embodiment, to address aliasing, in both static analysis (performed by the static analysis processor 510) and dynamic analysis (performed by the dynamic analysis processor 530), the node 500 may analyze what methods are invoked on each object, and based on that information, infer what fields of the object are accessed. However, it is possible for application code to alias, i.e., use one field of a type to reference another field of the same type. In one example, this is addressed either via user provided hints (such as the c++ restrict keyword), or by conservatively instantiating all fields of a given type when we detect access to any field of that type.

In one example, suppose the object structure is:

Order {
array<Item> items;
Item specialItem;
int orderid
}
Item {
int itemId;
String itemName;
}

In the above example, suppose the application code is specified as a user defined function in JAVA® bytecode, and involves accessing itemId and orderId. The static analysis processor 510 determines via static analysis (e.g., using a bytecode analysis tool, such as JAVA® ASM in the JAVA® environment) that these are the only accessed fields. Then in this case, the processing conservatively instantiates specialitem.itemId and items[i].itemId for all items.

The runtime (in-memory) layout will now be described below. The database management system (DBMS) community has improved query processors by orders of magnitude over the last decade, in large part by moving to columnar runtimes. As described herein, OX is presented as a DBMS supporting collections of objects from a rich class hierarchy, including multiple levels of nesting and repeat groups, with queries being pipelines of JAVA® lambda functions (for map and aggregate). OX works on objects. Operators such as (Flat)Map and Aggregate perform user-defined transformations on collections of objects. Dremel and Trill both perform columnar processing on object collections, but only on declarative queries that explicitly specify both the fields accessed and the operations performed on those fields. In contrast, in one embodiment a lambda function in OX is only available as bytecode that operates on entire objects.

In one embodiment, if the static analysis is available, then it may be used in one of three ways, or the dynamic analysis may be solely used as indicated in Table I below.

TABLE I

| Description | Static Analysis | Dynamic Analysis |
| --- | --- | --- |
| 1. May be used to drive an object instantiation for only the select set of accessed fields when the object is materialized. | Used to minimize loaded fields | None |
| 2. May be used to re-write the objects to contain only the fields referenced then materialize the entire object. This is memory cache friendly by having a reduced object size. | Used to minimize loaded fields and limit object size to improve cache efficiency | None |
| 3. May be used to re-write the objects to contain only the fields referenced then leverage dynamic analysis to only fetch fields "on-demand." This is memory cache friendly by having a reduced object size and is optimized for conditional field access. | Used to limit object size to improve cache efficiency | Used to load fields on demand |
| 4. Without static analysis, the dynamic analysis may be used to fault in fields "on-demand" into the original unmodified objects. This does not have the memory cache friendliness of the field reduced objects of 3 above. | None | Used to load fields on demand |

An example of a simple dataflow to form a thank-you letter for each order in a collection of high-value orders is presented below. The classic transaction processing performance council (TPC) BENCHMARK™ H (TPC-H) schema as a class hierarchy, slightly simplified for ease of exposition.

Example 1 is as follows:

class Order {int oid; Date odate; double ototprice;
Lineitem[ ] oitems; int ocustid; }
class Customer{int cid; int czip; double cdiscount;
String caddress;}
class Lineitem {int lid; int lsuppid;
int lpartid; Price lprice; int lqty;}
class Price {double discount; double tax;
double price; }
class Date {int timezone; int days5ince1970;}

In Example 1, Lineitem[ ] is nested within Order, because the Lineitems are part of, and exclusively owned by, an Order, and thus do not exist independently. In contrast, Customer is referenced in Order by an identifier ocustid, and thus normalized out of Orders, because one Customer can have multiple Orders (or no Order). Using this class hierarchy, the thank-you letter query may be readily written, by flowing a collection of orders through two lambda functions:

```
OxView<Order> allOrders = new OxView<Order>(
        fileName, ..);
OxView<Order> highValueOrders = allOrders.filter(
    o -> o.isHighValue( ));
OxView<Letter> thankyouLetters = highValueOrders.map(
    o -> new Letter(contacts.lookup(o.getCustId( )),
        o.getDetails( ));
```

As presented above, contacts is a data structure used to map a customer identifier to an address, and an OxView<T> is logically a collection of objects of type T.1. But physically, an OxView is just a pipeline of operators. The collection for an OxView is instantiated lazily—only when the pipeline encounters a damming operation, such as aggregation, is the OxView actually evaluated by running the operators in the pipeline.

Example 1 illustrates many features of this style of programming as follows. Schema agnostic and Encapsulated: Predicates and joins are both expressed within lambda functions. For example, to find the customer address of an order in structured query language (SQL), one would join with the Customer table on cid; this means the developer must know the schema, and ties the application to the schema. Instead, in one embodiment a method contacts.lookup(order) whose internals are isolated from the application is invoked.

In one example, relational database management systems (RDBMSs) do support some encapsulation via views. For example, instead of a lambda function, a view may be used to join the order with the customer table and produce (oid, caddress) pairs. The object-oriented programming languages community, however, has moved to greater levels of abstraction and detail. Objects can have subclasses with specialized implementations. For example, different kinds of orders can have different mapping to customer addresses. These mappings can contain loops and conditional branches, which are hard to implement in SQL. The use of lambda greatly simplifies the implementation of encapsulated, customized mapping logic.

In one embodiment, lambda functions allow for complex mappings. For example, while most addresses might be directly accessible via cid, a few (where the address is missing) may need a different logic, such as a loop through the records for family members. Further, the application can directly call external libraries, thereby avoiding any "impedance mismatch" between those libraries and the SQL.

In one embodiment, the programmer chooses the lookup function, and the data structure for contacts. This is in contrast with SQL, in which the DBMS controls the data structures for the join implementation. For example, the application could keep contacts as an in-memory hash table, a persistent hash index, or a B-tree, depending on how updates are performed.

To illustrate nested objects, consider a more complex situation. Suppose that o.isHighValue( ) computes a profit for an order, by accessing the lineitems that are nested within that order. Most relational DBMSs would normalize Lineitem out of Order, and therefore this computation would require an "expensive" (in terms of processing) join between two large tables, Lineitem and Order. While some joins, such as Lineitem-Part, are necessary because Parts exist independent of Lineitems and can be shared across Lineitems, normalization of Lineitems from Orders is necessary primarily because relational DBMSs do not support repeating groups well.

From the programmer's perspective, the Lineitems are naturally part of an Order, and are most conveniently stored there rather than in a separate table with which it has to be joined. The nested form also cuts the mismatch between the programmer's view and the database reality, and can also improve performance by avoiding a big join.

Returning to Example 1 to illustrate, functions getCustId( ) and getDetails( ) are only available as bytecode that operates on Order instances, not on individual fields of an Order tuple. In one embodiment, the OX runtime uses two techniques to attain the efficiency of a pure relational column store: a) it works on entire objects, but fills fields of the objects only as needed; b) it avoids object (con|de)struction and memory (de)allocation, through a reuse scheme for nested objects.

FIG. 6 illustrates an example pseudocode flow diagram 600 for analyzing general functions to find used members, according to an embodiment. In one embodiment, OX is written in JAVA®, so lambda functions are amenable to bytecode analysis. Using the ASM library (asm.ow2.org), arbitrary bytecode is inspected by implementing a visitor pattern. OX, using the static analysis processor 510 (FIG. 5) invokes ASM's bytecode analysis interface with a visitor object that supplies callback functions to be invoked at various points in the analysis, such as when ASM reaches a variable, a class member, or invokes a function. This analysis performed by the static analysis processor 510 is complicated because a lambda function can invoke other functions (including itself), and even functions from other classes, which may do call-backs to access members of the original object. Suppose a user passes in a functor class F to a map, over the OxView<Order>. Presume that Order has a member Container<Lineitem>oitems; (the Container is to hold the list, and is an OX Array, which will be introduced later: for this example, the Container is just any class). F has a method call( ) which invokes oitems.get(4).getQty( ). Here, a method of F is calling a method of Container, which in turn is calling a method of Lineitem—all these classes are different from Order, the class collection over which the map is applied.

To deal with such general invocation chains and aliasing possibilities, in one embodiment the static analysis processor 510 applies a recursive analysis for OX as shown in the pseudocode flow diagram 600. In one embodiment, the result of the analysis performed by the static analysis processor 510 is a list of all fields—from any of the classes in the composition hierarchy (CH), that are referenced during the invocation of a given lambda function. In Example 1, suppose that isHighValue( ) only needs ototprice, and that getDetails( ) needs only odetails. Then the plan produced automatically for Example 1 is as follows:

```
FormEmptyObjects(orders) -> SetField(ototprice) ->
Filter:isHighValue( ) -> SetField(ocustId) ->
Lookup(contacts_ht) -> SetField(odetails) ->.
Map:(o -> new Letter(contacts.lookup(o.getCustId( )), o.getDetails( )));.
```

The FormEmptyObjects operator forms a batch of empty Order objects, with no allocation for array fields (oitems and opromocodes)—they are initialized to empty. The static analysis processor 510 then loads the ototprice column and uses it to set Order.ototprice, filter on isHighValue( ) then load and set Order.ocustId to join with contacts_ht, before loading Order.odetails.

Suppose getDetails( ) looked at oitems[ . . . ].lqty as well, in addition to odetails. Then the analysis performed by the static analysis processor 510 would produce a different plan:

```
FormEmptyObjects(orders) -> SetField(ototprice) ->
Filter:isHighValue( ) -> SetField(ocustId) ->
Lookup(contacts_ht) -> SetField(odetails) ->
SetArrayFld(oitems) -> SetField(oitems.lqty) ->
Map:(o -> new Letter(contacts.lookup(o.getCustId( )), o.getDetails( )));
``` where SetArrayFld(oitems) scans only the oitems.offset column and accordingly forms arrays of correct size for each Order, which are initialized with the default constructor of Lineitem, before SetField(oitems.lqty) sets the correct value for lqty.

FIG. 7 is an example pseudocode flow diagram 700 for selective column loading for general query, according to an embodiment. In one embodiment, the processing performed by the dynamic analysis processor 530 (FIG. 5) performs the processing represented by the pseudocode flow diagram 700 and generalizes the approach to selectively load columns for queries over a general CH. Given a set of fields accessed in a query, a minimal subtree of the CH is found that contains all these fields. Within this subtree, the dynamic analysis processor 530 loads both the columns corresponding to these accessed fields and columns for any array offset fields that are ancestors of these accessed fields (e.g., if lqty is accessed, also loaded is oitems.offset).

Figure 8:
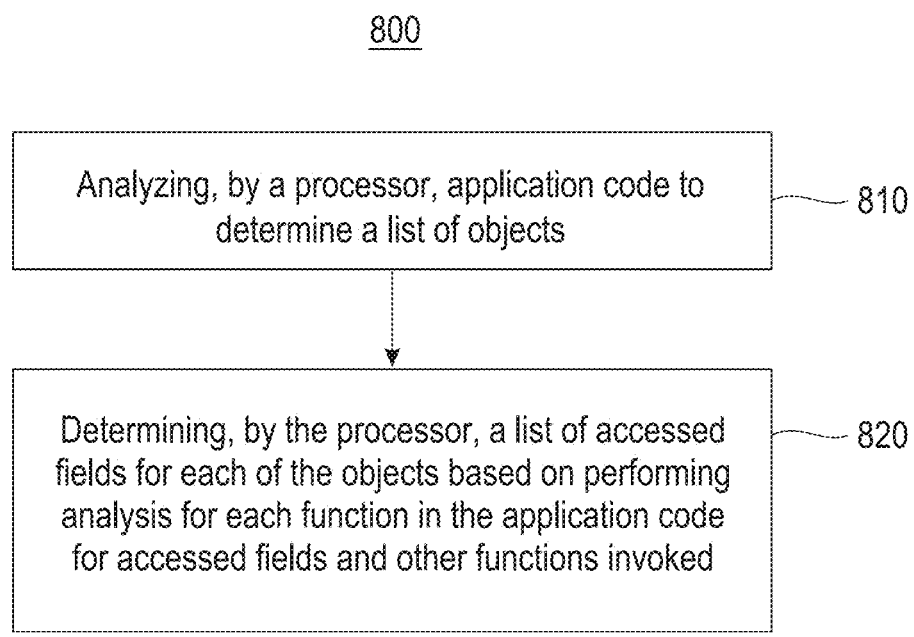
FIG. 8 illustrates a block diagram for a process transparent partial object instantiation for object oriented applications, according to one embodiment.

FIG. 8 illustrates a block diagram for a process 800 for transparent partial object instantiation for object oriented applications, according to one embodiment. In one embodiment, in block 810 a processor (e.g., the static analysis processor 510 and/or the dynamic processor 530, FIG. 5), analyzes application code to determine a list of objects. In block 820, the processor determines a list of accessed fields for each of the objects (in the list of objects) based on performing analysis for each function in the application code for accessed fields and other functions invoked. In one embodiment, process 800 may include that performing the analysis for each function in the application code comprises recursively analyzing the invoked functions to determine the list of accessed fields.

In one embodiment, the process 800 may include that the processor operates in a nested object environment. In one embodiment, the process 800 may further include dynamically analyzing, by the processor, the application code for determining faults when un-materialized fields of the objects are referenced by dynamically processing the application code that fetches any required persistent data and filling in a class field to allow access. In one embodiment, during the dynamic analyzing, superclasses are treated as members regarding instantiation.

In one embodiment, process 800 may include that setter methods and constructors are treated as a special case based on determining no access and eliminating or avoiding the application code that processes assignments. In one embodiment, process 800 may further include addressing aliasing by determining methods are that are invoked on each object, and inferring fields of the object that are accessed. In one embodiment, for the application code including use of one field of a first type to reference another field of the first type, receiving hints or instantiating all fields of a particular type upon detecting access to any field of the particular type.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    statically analyzing, by a processor, object oriented executing application code by using a bytecode analysis interface to step through the object oriented executing application code to determine a list of a plurality of objects, wherein the objects are persisted objects;
    determining, by the processor, a list of all accessed fields for each of the objects based on performing recursive analysis using the bytecode analysis interface for each function in the object oriented executing application code for all of the accessed fields and other functions invoked by each of the functions recursively analyzed;
    dynamically analyzing, by the processor, the object oriented executing application code and determining faults for empty fields of the objects that are referenced by functions in the object oriented executing application code by dynamically processing the object oriented executing application code that fetches required data; and
    dynamically filling in, by the processor, a particular field that is empty with the fetched data to allow access of the fetched data for the particular field.

2. The method of claim 1, wherein the processor operates in a nested object environment.

3. The method of claim 1, wherein during the dynamic analyzing superclasses are treated as class members for class instantiation of an object.

4. The method of claim 3, wherein setter methods and constructors are treated as a special case for set up fields that are never accessed such that a portion of the object oriented executing application code that processes assignments for the set up fields that are never accessed are eliminated or avoided.

5. The method of claim 1, further comprising addressing aliasing by determining methods that are invoked on each object, and inferring fields of the objects that are accessed.

6. The method of claim 5, wherein for the object oriented executing application code including use of one field of a first type to reference another field of the first type, and receiving hints or instantiating all fields of a particular type upon detecting access to any field of the particular type.

7. A computer program product comprising a non-transitory computer readable storage device having program instructions embodied therewith, the program instructions executable by a processor to cause the processor to:
    statically analyze, by the processor, object oriented executing application code by using a bytecode analysis interface to step through the object oriented executing application code to determine a list of a plurality of objects, wherein the objects are persisted objects;
    determine, by the processor, a list of all accessed fields for each of the objects based on performing recursive analysis using the bytecode analysis interface for each function in the object oriented executing application code for all of the accessed fields and other functions invoked by each of the functions recursively analyzed;
    dynamically analyze, by the processor, the object oriented executing application code and determining faults for empty fields of the objects that are referenced by functions in the object oriented executing application code by dynamically processing the object oriented executing application code that fetches required data; and
    dynamically fill in, by the processor, a particular field that is empty with the fetched data to allow access of the fetched data for the particular field.

8. The computer program product of claim 7, wherein the processor operates in a nested object environment.

9. The computer program product of claim 7, wherein during the dynamic analyzing, superclasses are treated as class members for class instantiation of an object.

10. The computer program product of claim 7, wherein setter methods and constructors are treated as a special case for set up fields that are never accessed such that a portion of the object oriented executing application code that processes assignments for the set up fields that are never accessed are eliminated or avoided.

11. The computer program product of claim 7, further comprising program instructions executable by the processor to cause the processor to:
    address, by the processor, aliasing by determining methods are that are invoked on each object, and infer fields of the objects that are accessed.

12. The computer program product of claim 11, wherein for the object oriented executing application code including use of one field of a first type to reference another field of the first type, and receiving hints or instantiating all fields of a particular type upon detecting access to any field of the particular type.

13. An apparatus comprising:
    a memory configured to store instructions; and
    a processor configured to execute the instructions to:
        statically analyze object oriented executing application code by using a bytecode analysis interface to step through the object oriented executing application code to:
        determine a list of a plurality of persisted objects, and determine a list of all accessed fields for each of the persisted objects based on performing recursive analysis using the bytecode analysis interface for each function in the object oriented executing application code for all of the accessed fields and other functions invoked by each of the functions recursively analyzed; and
        dynamically analyze the object oriented executing application code and determine faults for empty fields of the persisted objects that are referenced by functions in the object oriented executing application code by dynamically processing the object oriented executing application code that fetches required data, and dynamically fill in a particular field that is empty with the fetched data to allow access of the fetched data for the particular field.

14. The apparatus of claim 13, wherein the processor operates in a nested object environment.

15. The apparatus of claim 13, wherein during the dynamic analysis, superclasses are treated as class members for class instantiation of an object, and setter methods and constructors are treated as a special case for set up fields that are never accessed such that a portion of the object oriented executing application code that processes assignments for the set up fields that are never accessed are eliminated or avoided.

16. The apparatus of claim 15, wherein the processor is further configured to execute the instructions to address aliasing by determining methods that are invoked on each object, and infer fields of the persisted objects that are accessed, wherein for the object oriented executing application code including use of one field of a first type to reference another field of the first type, and receiving hints or instantiating all fields of a particular type upon detecting access to any field of the particular type.

* * * * *